United States Patent
Prats

(10) Patent No.: US 10,946,519 B1
(45) Date of Patent: Mar. 16, 2021

(54) OFFLINE COMPUTATION AND CACHING OF PRECALCULATED JOINT TRAJECTORIES

(71) Applicant: X Development LLC, Mountain View, CA (US)

(72) Inventor: Mario Prats, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 305 days.

(21) Appl. No.: 16/205,427

(22) Filed: Nov. 30, 2018

(51) Int. Cl.
| | | |
|---|---|---|
| B25J 9/00 | (2006.01) | |
| B25J 9/16 | (2006.01) | |
| B25J 9/02 | (2006.01) | |
| G05B 1/06 | (2006.01) | |
| G05B 11/00 | (2006.01) | |
| G05B 13/00 | (2006.01) | |
| G05B 15/00 | (2006.01) | |
| G05B 19/19 | (2006.01) | |

(52) U.S. Cl.
CPC .......... *B25J 9/1664* (2013.01); *B25J 9/023* (2013.01); *G05B 1/06* (2013.01); *G05B 11/00* (2013.01); *G05B 13/00* (2013.01); *G05B 15/00* (2013.01); *G05B 19/19* (2013.01); *G05B 2219/40428* (2013.01)

(58) Field of Classification Search
CPC ......... B25J 9/1664; B25J 9/023; G05B 19/19; G05B 15/00; G05B 13/00; G05B 11/00; G05B 1/06; G05B 2219/40428
See application file for complete search history.

(56) References Cited

U.S. PATENT DOCUMENTS

| | | | | |
|---|---|---|---|---|
| 9,283,048 | B2* | 3/2016 | Kostrzewski | A61B 34/30 |
| 2016/0069677 | A1* | 3/2016 | Garvey | G01B 21/04 |
| | | | | 33/503 |

OTHER PUBLICATIONS

Noreen, et al. "A Comparison of RRT, RRT* and RRT*—Smart Path Planning Algorithms." International Journal of Computer Science and Network Security (IJCSNS) 16.10 (2016): p. 20-27.

* cited by examiner

*Primary Examiner* — Ian Jen
(74) *Attorney, Agent, or Firm* — Middleton Reutlinger

(57) ABSTRACT

Implementations are described herein for offline computation and caching of precalculated joint trajectories. In various implementations, an instruction may be obtained to move an end effector of a robot between start and target positions. A first type of trajectory planning may be performed in real time or "online" to calculate a first joint trajectory of the robot that moves the end effector from the start to target position. The robot may then implement the first joint trajectory. A second type of trajectory planning may be performed offline, e.g., during downtime of the robot, to precalculate a second joint trajectory of the robot to move the end effector from the start to target position. The second type of trajectory planning may require more resources than were required by the first type of trajectory planning. Data indicative of the precalculated second joint trajectory of the robot may be stored for future use.

20 Claims, 6 Drawing Sheets

OFFLINE COMPUTATION AND CACHING OF PRECALCULATED JOINT TRAJECTORIES

BACKGROUND

Robot arm motion planning is a computationally expensive problem. It requires searching for a collision-free joint trajectory in a high-dimensional space. For example, if the high-dimensional space is joint space, then the dimensionality of the high-dimensional joint space may be equal to the number of joints in the robot (e.g., the degrees of freedom of movement). One way to approach joint trajectory planning is to use sampling-based methods in which random or quasi-random joint configurations are sampled and checked for collisions. The collision-free joint configurations are then used to create a graph connecting collision-free joint configurations.

Much of the computational complexity of this type of joint trajectory planning comes from the collision-checking. Finding a solution for a typical trajectory planning problem can take from a few milliseconds (for environments with few obstacles) to a few seconds for more complex problems near obstacles. Additional constraints like maintaining an end effector (e.g., gripper) orientation or finding joint trajectories that are proximate to the robot body make the problem much more complex and computationally expensive. Many robot tasks may be repetitive in nature, and so recalculating joint trajectories time and time again may waste resources such as time and/or computing resources (e.g., CPU cycles, memory, etc.).

In dynamic environments where obstacles are not known beforehand, the trajectory planning problem must be solved online, e.g., in real time, while the robot is running. Consequently, there is a tradeoff between planning time and the quality of the planned joint trajectory. Many trajectory planning techniques, such as rapidly-exploring random tree ("RRT"), can find a joint trajectory solution quickly, but these hastily-calculated joint trajectory solutions may be largely suboptimal. As noted previously, many of these online techniques employ random or quasi-random sampling and collision detection, with little concern for robot wear-and-tear, execution time, distance traveled, etc. With longer planning times, better joint trajectory solutions can be found, e.g., using more resource-intensive techniques such as rapidly-exploring random tree star ("RRT*") and others. However, using these resource-intensive techniques in real time may lead to unacceptable latency in robot operation.

SUMMARY

The present disclosure is generally directed to methods, apparatus, and computer-readable media (transitory and non-transitory) for identifying tasks likely to be implemented repeatedly by a given robot, performing relatively complex (e.g., computationally and/or temporally intensive) trajectory planning offline to generate precalculated joint trajectories that are applicable to perform the tasks, and caching data indicative of the precalculated joint trajectories for future use, e.g., by the same or different robots. These offline calculations may benefit from additional time and/or computing resources (e.g., in a cloud infrastructure, onboard the robot while the robot is inactive) that may not be available during real time operation of a robot. Consequently, the precalculated joint trajectories may be better optimized than joint trajectories calculated in real time, or "online." Thereafter, robots can leverage the precalculated joint trajectories to perform comparable tasks, rather than relying on hastily-calculated joint trajectories calculated in real time.

There are various ways of identifying tasks—more particularly, pairs of start and target end effector positions—that are likely to be implemented repeatedly by a given robot. A given robot deployed in a given environment such as a home may be instructed to perform various particular tasks (e.g., cleaning, tidying) that require moving an end effector between respective start and target positions. If the task is requested once, that may increase the likelihood that the task (or at least a comparable task) will be requested again in the future. And if the task likely to be requested again in the future, it follows that one or more start/target position pairs involved with performing the task will be encountered by the robot again. Accordingly, techniques described herein may be employed to generate, offline, precalculated joint trajectories that are useable by the robot in the future to move its end effector between the one or more start/target position pairs.

In various implementations, after obtaining an instruction to move an end effector of a robot from a start position to a target position, a first type of trajectory planning may be performed in real time (or "online"), e.g., by logic integral with the robot, to calculate a first joint trajectory of the robot that moves the end effector from the start position to the target position. The robot may be relatively resource-constrained, and may be expected to operate with minimal latency. Accordingly, the first type of trajectory planning, such as RRT planning, may be employed because it requires a relatively small amount of resources (e.g., time, memory, processor cycles). For the time being, and in order to accomplish the task without too much latency, the robot may be operated to effectuate the first joint trajectory. However, as noted above, this hastily-calculated first trajectory may be suboptimal for a variety of reasons. For one thing, it may be generated from random or quasi-random sampling of joint trajectories. And in some cases, the online trajectory planner may be unable to find a satisfactory trajectory within various time constraints imposed by the environment and/or by an operator of the robot.

Accordingly, in various implementations, data indicative of the task, such as the start and target positions of the end effector, starting and end joint configurations, etc., may be used "offline" to calculate better joint trajectories. For example, in some implementations, a second type of trajectory planning, such as RRT*, may be performed, e.g., by the robot while it is inactive and/or remotely from the robot (e.g., in a cloud infrastructure with virtually limitless resources at its disposal) to precalculate a second joint trajectory of the robot to move the end effector from the start position to the target position. Performing the second type of trajectory planning may require a second amount of resources that is greater than the first amount of resources required by the first type of trajectory planning, which is why it might not be performable by the robot in real time. However, by performing the second type of trajectory planning offline, the resultant precalculated joint trajectory may be leveraged at a later time to achieve more optimal robot movement.

In various implementations, the data indicative of the precalculated joint trajectories may be indexed in a database by a variety of different data points, such as start/target position pairs, start and target joint configurations (i.e., joint poses), environmental states, etc. Subsequent tasks may be matched to these different data points based on aspects of the subsequent tasks being "comparable" to these indexed data points. "Comparable" as used herein is not limited to exact matches. Rather, comparable means aspects of the subsequent tasks are sufficiently similar to indexed data points that precalculated joint trajectories stored in the database in association with the comparable indexed data points are likely reusable (with or without modification) to accomplish the subsequent task.

In some implementations, records of the database may be indexed by joint configuration pairs. Each joint configuration pair (and hence, each record) may include a start and target joint configurations corresponding, respectively, with start and target positions of a robot end effector. Subsequent start/target joint configurations associated with subsequent tasks may be comparable to the indexed start/target joint configurations where, for instance, the subsequent start/target joint configurations are within some predetermined distance (e.g., Euclidian distance) of the indexed start/target joint configurations, e.g., in joint space (or some other latent space).

Additionally or alternatively, in some implementations, records of the database may be indexed by start/target position pairs. Each position pair (and hence, each record) may include a start position and target position of a robot end effector. Subsequent start/target positions associated with subsequent tasks may be comparable to the indexed start/target positions where, for instance, the subsequent start/target positions are within some predetermined distance of the indexed start/target joint positions, e.g., in Cartesian space.

In some implementations, each record of the database, whether indexed on joint configuration pairs, position pairs, or even a state of a dynamic environment in which a robot operates, may include one or more precalculated joint trajectories. In some implementations the precalculated joint trajectories may be stored in association with the record as a linked list, although this is not required. The precalculated joint trajectories may be usable by one or more robots, e.g., upon receiving a subsequent instruction having aspects (e.g., start/target joint configurations, start/target positions) comparable to the joint configuration/position pair. In various implementations, a robot may select a particular joint trajectory from a plurality of precalculated joint trajectories associated with a particular database record by determining that the particular joint trajectory will not result in a collision with a dynamic obstacle of an environment in which the robot operates.

In some implementations, a robot may select a precalculated joint trajectory in lieu of performing any trajectory planning at all, assuming a suitable joint trajectory (precalculated for a comparable task) can be found. Additionally or alternatively, the robot may perform online trajectory planning (e.g., RRT) in real time in parallel with searching for a more optimal precalculated joint trajectory. If a suitable precalculated joint trajectory cannot be found, the real-time calculated trajectory may be effected by the robot as a fallback position.

Techniques described herein give rise to various technique advantages. By precalculating optimized joint trajectories, various resources, such as time, memory, and computing resources, are conserved, especially for implementations in which real-time trajectory planning is avoided. Additionally, by leveraging precalculated joint trajectories, it is possible to reduce robot latency in many circumstances while also having the robot perform tasks in a more optimal manner. For example, a real-time calculated joint trajectory may inflict more wear and tear on a robot than optimized joint trajectories precalculated offline. Moreover, by employing techniques described herein on a robot-by-robot basis, a robot can be optimized for a particular environment in which it is deployed (and will likely repeatedly perform similar tasks), such as a home or workplace. Additionally, in some implementations, only data related to tasks actually performed by the particular robot are used to precalculate joint trajectories. Thus, the precalculated joint trajectories accumulated for a given robot may not grow so large in size that searching it becomes unacceptably resource-intensive.

In some implementations, a computer implemented method may be provided that includes: obtaining an instruction to move an end effector of a robot from a start position to a target position; performing, in real time, a first type of trajectory planning to calculate a first joint trajectory of the robot that moves the end effector from the start position to the target position, wherein performing the first type of trajectory planning requires a first amount of resources; operating the robot to effectuate the first joint trajectory; performing a second type of trajectory planning to precalculate a second joint trajectory of the robot to move the end effector from the start position to the target position, wherein performing the second type of trajectory planning requires a second amount of resources that is greater than the first amount of resources required by the first type of trajectory planning; and storing, in a database that is accessible to one or more robots, data indicative of the precalculated second joint trajectory of the robot, wherein the precalculated second joint trajectory is subsequently usable by one or more of the robots upon receiving a subsequent instruction that is comparable to the instruction.

This method and other implementations of technology disclosed herein may each optionally include one or more of the following features.

In various implementations, the second type of trajectory planning may include rapidly-exploring random tree star ("RRT*") planning. In some such implementations, the first type of trajectory planning may include rapidly-exploring random tree ("RRT") planning.

In various implementations, the database may be indexed by joint configuration pairs, each joint configuration pair including a start joint configuration and a target joint configuration. In various implementations, a given joint configuration pair in the database may be linked to data indicative of a plurality of pre-calculated joint trajectories to move a robot end effector from the start joint configuration of the given joint configuration pair to the target joint configuration of the given joint configuration pair. In various implementations, one or more of the plurality of pre-calculated joint trajectories may have been pre-calculated using the second type of trajectory planning. In various implementations, the subsequent instruction may be matched to the joint configuration pair to which the precalculated second joint trajectory is linked.

In various implementations, the database may be indexed by position pairs, each position pair including a start position and a target position of a robot end effector. In various implementations, the first type of trajectory planning may be performed using logic integral with the robot. In some such implementations, the second type of trajectory planning may be performed remotely from the robot. In other such implementations, the second type of trajectory planning may be performed using the logic integral with the robot during a period of inactivity of the robot.

In various implementations, the subsequent instruction may be comparable to the instruction when one or both of start and end joint configurations required to implement the subsequent instruction are within a predetermined Euclidian distance, in joint space, of one or both of start and end joint configurations required to implement the instruction.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
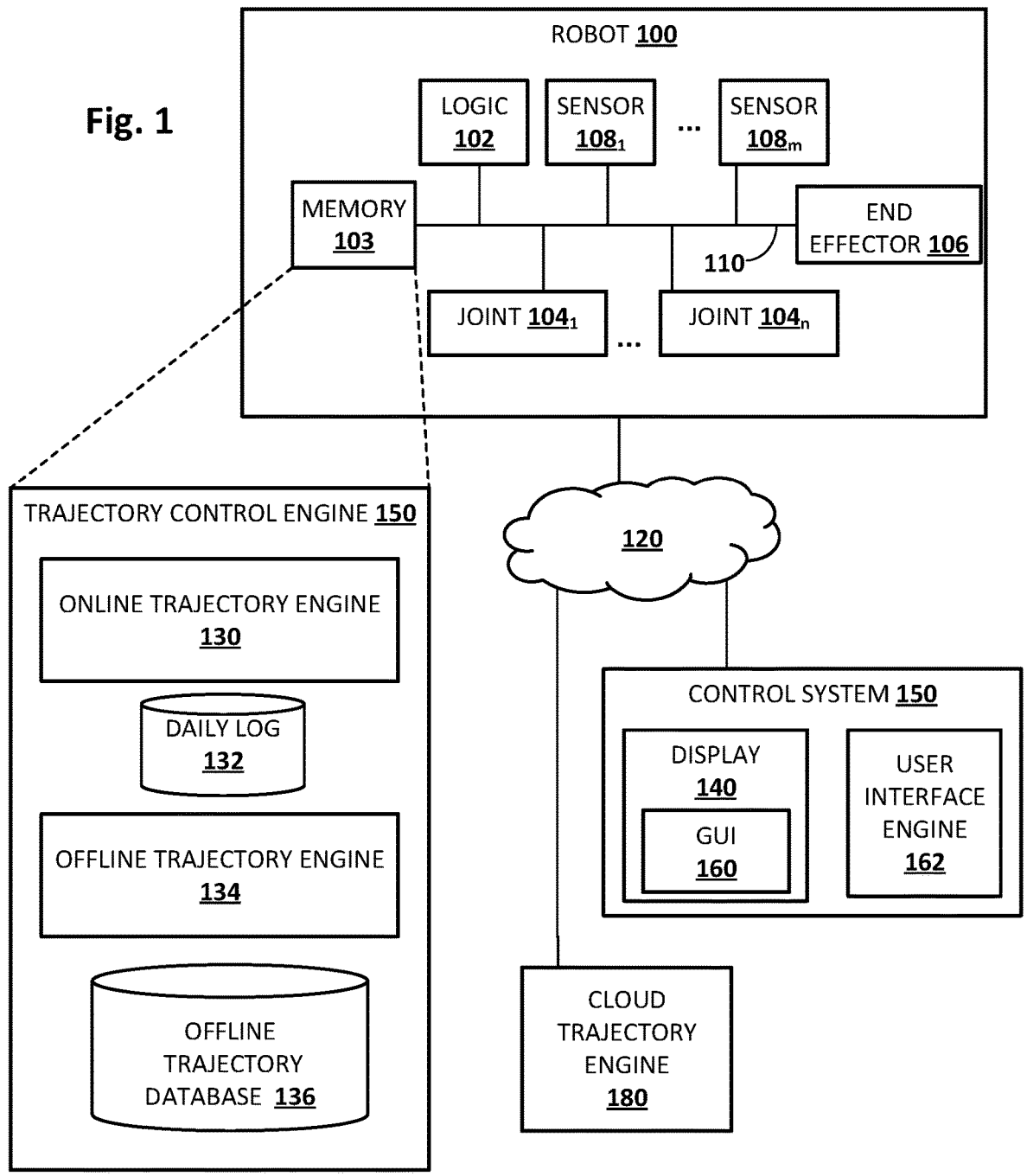
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A robot 100 may be in communication with a control system 150, e.g., via one or more wired and/or wireless computer networks 120 (e.g., Wi-Fi, Bluetooth, Ethernet, etc.). Robot 100 may take various forms, including but not limited to a telepresence robot, a robot arm (stationary or with a moveable base), a humanoid, an animal, an insect, an aquatic creature, a wheeled device, a submersible vehicle, an unmanned aerial vehicle ("UAV"), and so forth.

In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more joints $104_{1-n}$, one or more end effectors 106, and/or one or more sensors $108_{1-m}$, e.g., via one or more buses 110. As used herein, a robot "joint" 104 may broadly refer to actuators, motors (e.g., servo motors), joints, shafts, gear trains, pumps (e.g., air or liquid), pistons, drives, or other components that may create and/or undergo propulsion, rotation, and/or motion. Some joints 104 may be independently controllable, although this is not required. In some instances, the more joints robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, fluid nozzles, and so forth. In some implementations, end effector 106 may be removable, and various types of modular end effectors may be installed onto robot 100, depending on the circumstances.

Sensors 108 may take various forms, including but not limited to 3D laser scanners or other 3D vision sensors (e.g., stereographic cameras used to perform stereo visual odometry) configured to provide depth measurements, two-dimensional cameras, "2.5D" cameras, light sensors (e.g., passive infrared), force sensors, pressure sensors, pressure wave sensors (e.g., microphones), proximity sensors (also referred to as "distance sensors"), depth sensors, torque sensors, bar code readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1-m}$ are depicted as being integral with robot 100, this is not meant to be limiting. In some implementations, sensors 108 may be located external to, but may be in direct or indirect communication with, robot 100, e.g., as standalone units or as part of control system 150.

Control system 150 may include one or computing systems connected by one or more networks (not depicted) that control operation of robot 100 to various degrees. In some implementations, control system 150 may be operated by a user (not depicted) to exert a relatively high level of control over robot 100, e.g., in real time in response to signals received by a user interface engine 162 and/or one or more readings from one or more sensors 108. For example, a user may interact with a graphical user interface ("GUI") 160 rendered on a display 140 (e.g., CRT, LCD, touchscreen, etc.) by user interface engine 162 to interactively "jog" various components of the robot in various directions, e.g., by providing robot 100 with one or more input velocities for robot 100 itself and/or end effector 106. Additionally or alternatively, in some implementations, GUI 160 may be operable by a user to provide one or more high-level commands to robot 100, such as "move the dishes from the table to the sink," or "put the toys in the toy chest."

Various modules or engines may be implemented by robot 100 as software, hardware, or any combination of the two. For example, in FIG. 1, memory 103 includes instructions that are executable by logic 102 to implement an online trajectory engine 130 and an offline trajectory engine 134. While engines 130 and 134 (and their constituent databases) are depicted as being integral with robot 100 in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In other implementations, control system 150 may be implemented entirely or in part using logic 102 of robot 100.

Online trajectory engine 130 may be configured to generate trajectories, e.g., joint trajectories or end effector trajectories, for all or portions of robot 100, e.g., based on relatively high level tasks assigned to robot 100 by a user operating GUI 160. As used herein, a "joint trajectory" may refer to a sequence of joint configurations (or more generally, robot poses) that are implemented, one after another, while robot 100 performs one or more actions. An "end effector trajectory," by contrast, refers to a trajectory of a reference point of end effector 106 through Cartesian space. Online trajectory engine 130 is referred to as "online" because it computes trajectories on an as-needed basis, e.g., on the fly and/or in real time as a user commands robot 100 to perform various tasks. To avoid latency or lag between issuance of commands and performance of those commands, online trajectory engine 130 may be configured to employ trajectory computation techniques that are relatively fast, including random or quasi-random sampling techniques such as rapidly-exploring random tree ("RRT").

In various implementations, online trajectory engine 130 may store data indicative of trajectories it computes in a daily log 132. The fact that it is described as a "daily" log 132 is not meant to be limiting. Rather, daily log 132 may be used to store trajectories generated during any active period of operation of robot 100. In some cases these may be trajectories generated during a given day, but this is not required. Data indicative of trajectories may include, for instance, a starting point and an ending (or "target") position of end effector 106, starting and ending joint configurations, an entire joint trajectory that was implemented to move end effector 106 between start and target positions, and so forth.

In contrast to online trajectory engine 130, offline trajectory engine 134 may be configured to calculate trajectories during downtimes of robot 100, i.e. while robot 100 is "offline." Because it operates during downtime, offline trajectory engine 134 may have sufficient time and/or computing resources at its disposal to perform more resource-intensive trajectory calculations (e.g., RRT*) than online trajectory engine 130. In various implementations, offline trajectory engine 134 may be configured to perform its trajectory planning operations based on the data stored in daily log 132. For example, in some implementations, offline trajectory engine 134 may use data stored in daily log 132 to calculate, e.g., during the night in what might be referred to as "dreaming," joint trajectories that are more optimized than those calculated by online trajectory engine 130. These superior trajectories may be stored or "cached" in an offline trajectory database 136 so that they may be used by robot 100 at a later time, e.g., when robot 100 performs tasks that require similar trajectories.

In some implementations, offline trajectory planning may occur elsewhere in addition to or instead of at offline trajectory engine 134. For example, in some implementations, a cloud trajectory engine 180 may be operated on one or more server computers (e.g., blades) that form what is often referred to as a "cloud" infrastructure. With the virtually limitless resources of the cloud at its disposal, cloud trajectory engine 180 may be able to perform offline trajectory planning at any time, regardless of whether robot 100 is offline or not. In some implementations, cloud trajectory engine 180 may perform trajectory planning for a plurality of robots, e.g., based on a plurality of daily logs (e.g., 132) generated by the plurality of robots. Cloud trajectory engine 180 may then distribute the trajectory data it computes for each of the robots back to the respective robot, or at least make them available to robot 100.

Figure 2:
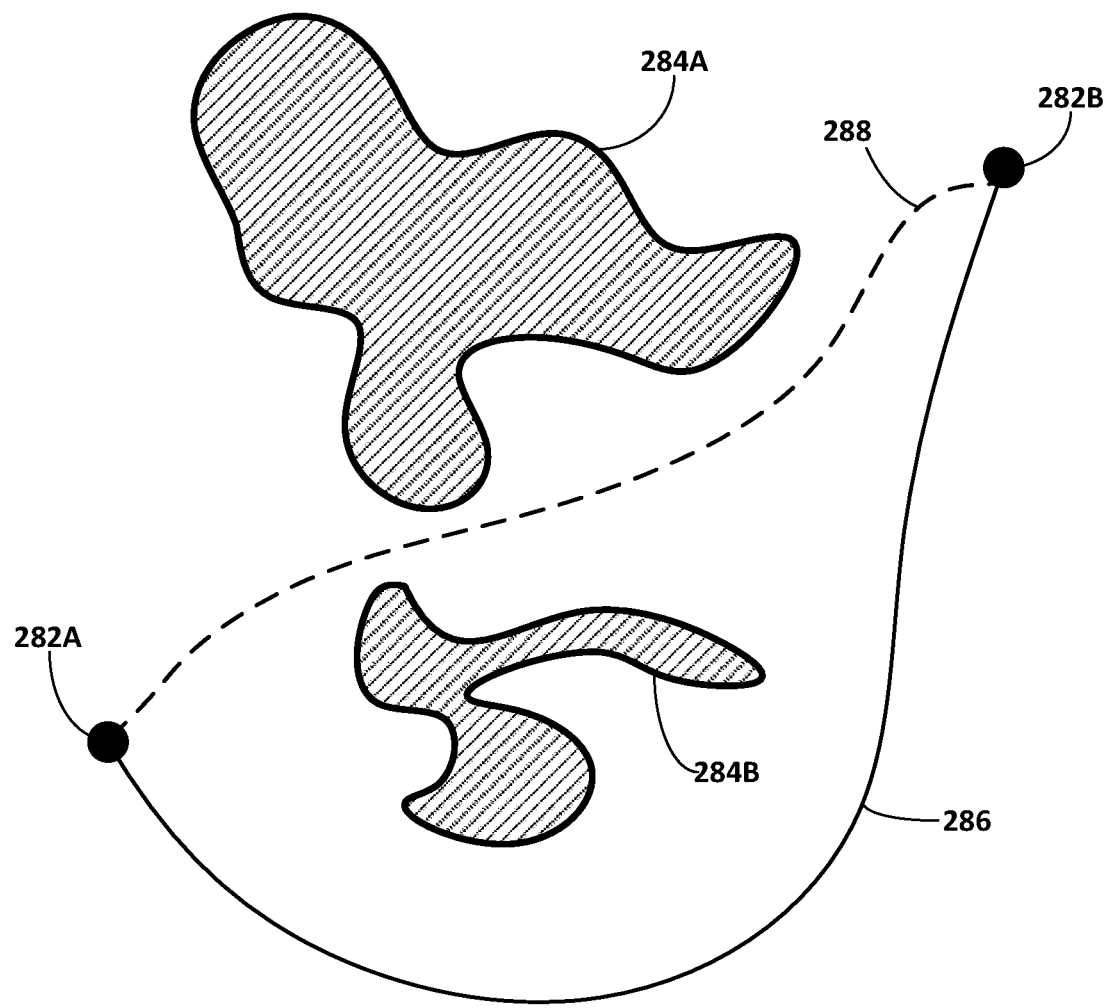
FIG. 2 depicts an example scenario in which techniques described herein may be practiced, in accordance with various implementations.

FIG. 2 depicts an example of how techniques described herein may be employed to improve upon a hastily-generated joint trajectory generated for a robot in real time. In FIG. 2, assume that a robot (not depicted in FIG. 2, see 100 in FIG. 1) taking the form of a robot arm has received an instruction to perform a task that requires it to move a reference point of its end effector (e.g., 106) from a start position 282A to a target position 282B. Suppose further that multiple obstacles 284A, 284B are situated between start position 282A and target position 282B.

In order to traverse the reference point of the end effector from start position 282A to target position 282B, online trajectory engine 130 may calculate a first joint trajectory that causes the end effector reference point to traverse a first Cartesian trajectory 286 that avoids obstacles 284A and 284B. The first joint trajectory that is implemented to traverse the end effector along the first Cartesian trajectory 286 may be relatively simple to calculate given the wide berth given to obstacles 284A and 284B. For example, the first joint trajectory may be calculated by randomly (or quasi-randomly) sampling one or more joint configurations that place the end effector somewhere along first Cartesian path 286, and then building the remainder of the first joint trajectory using those configurations as "seeds." Consequently, latency between issuance of the command to the robot and the robot performing the task may be minimal. However, first Cartesian trajectory 286 (and the first joint trajectory underlying it) may not be ideal for a variety of reasons, such as it might require a relatively large amount of time to traverse, it may cause a relatively large amount of wear and tear on one or more joints of the robot arm, etc.

Accordingly, in various implementations, online trajectory engine 130 may store data indicative of first Cartesian trajectory 286 and/or its underlying joint trajectory, such as start position 282A and target position 282B, starting and end joint configurations, etc., in daily log 132. Once the robot is no longer in operation (i.e., downtime, offline), offline trajectory engine 134 may perform more computationally expensive forms of trajectory planning, e.g., RRT*, to compute a second joint trajectory that when implemented moves the robot end effector along a second Cartesian trajectory 288 from start position 282A to target position 282B. Additionally or alternatively, data indicative of Cartesian trajectory 286 and/or its underlying joint trajectory may be provided to online trajectory engine 130, which may perform similar trajectory planning as offline trajectory engine 134 to compute the second joint trajectory that can be implemented to achieve second Cartesian trajectory 288.

In either case, with the benefit(s) of extra time and/or available computing resources, trajectory planning for the second joint trajectory underlying second Cartesian trajectory 288 may be more thoughtful than that for first joint trajectory underlying first Cartesian trajectory 286, e.g., because obstacles 284A and 284B can be considered more thoroughly and a more intelligent path can be found between them. As depicted in FIG. 2, second Cartesian trajectory 288 passes between obstacles 284A and 284B, rather than going around them. Because it is shorter than first Cartesian trajectory 286, second Cartesian trajectory 288 may require less time for the robot to traverse. Additionally or alternatively, the second joint trajectory underlying second Cartesian trajectory 288 may cause less wear and tear on joints of the robot arm than the first joint trajectory underlying first Cartesian trajectory 286, may require less power, and so forth.

Figure 3:
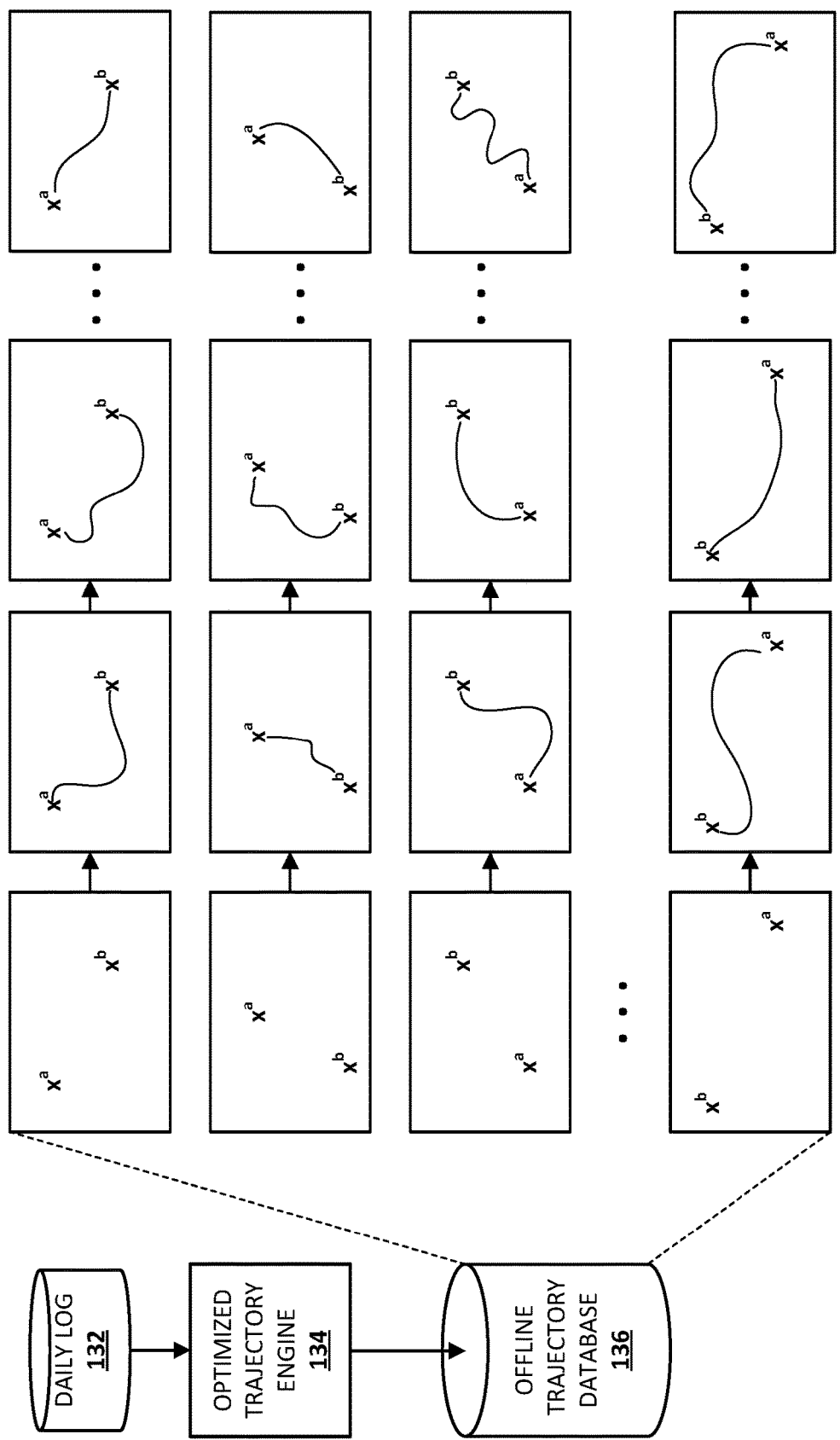
FIG. 3 an example of how precalculated joint trajectories may be indexed and cached, in accordance with various implementations.

FIG. 3 schematically depicts an example of how offline trajectory engine 134 may precalculate, or cache, data indicative of relatively optimized joint trajectories in offline trajectory database 136, e.g., for subsequent use by online trajectory engine 130 of robot 100. In some implementations, when robot 100 receives a command to perform a task that requires traversal of end effector 106 between two or more points, online trajectory engine 130 may attempt to locate a suitable precalculated joint trajectory in offline trajectory database 136, e.g., in parallel with attempting to calculate a fresh joint trajectory on the fly. If online trajectory engine 130 is able to locate a precalculated joint trajectory that would suffice under current circumstances (e.g., similar start/target end effector positions, similar starting and target joint configurations, similar environmental states), online trajectory engine 13 may retrieve that precalculated joint trajectory and use it to generate joint commands for joints $104_1$-$104_N$. Meanwhile, online trajectory engine 130 abandon its efforts to compute a fresh trajectory on the fly. Or, if online trajectory engine 130 already computed a fresh trajectory, that fresh trajectory may simply be discarded in favor of the precalculated joint trajectory.

In FIG. 3, offline trajectory database stores a plurality of precalculated joint trajectories, as shown by the two-dimensional matrix of boxes with trajectories between point $x^a$ and $x^b$. The leftmost box in each row includes the start and target positions $x^a$ and $x^b$ (e.g., of an end effector reference point) without any trajectory between them. This leftmost box may represent the index of that row, and hence may be referred to as the "index." Thus, the rows of precalculated trajectories in FIG. 3 are indexed by start/target position pairs in Cartesian space.

Each box to the right of the index box in each row represents one precalculated joint trajectory between the two positions associated with the index box. The trajectory depicted between $x^a$ and $x^b$ may represent the Cartesian trajectory of an end effector reference point. While not depicted in FIG. 3, each precalculated box to the right of the indices may include a precalculated joint trajectory (in joint space) that was implemented to traverse the end effector reference point along the depicted Cartesian trajectory. For example, in the index box of the first row, $x^a$ is towards the top left of the index box and $x^b$ is towards the bottom right of the index box. The boxes to the right of the first row index box show candidate precalculated Cartesian trajectories between $x^a$ and $x^b$. As noted previously, precalculated joint trajectories used to move the end effector along these Cartesian trajectories are also stored in database 136. In the index box of the second row, $x^a$ is near the top middle and $x^b$ is at bottom left. Again, the boxes to the right of the second row index box show precalculated candidate Cartesian trajectories between $x^a$ and $x^b$. The remaining rows are arranged similarly. While four rows are depicted, as indicated by the ellipses, there can be any number of rows corresponding to any number of start/target position pairs. Moreover, each row may include one or more precalculated trajectories, new rows may be added later, and new precalculated trajectories may be added to each row.

In some implementations, when robot 100 receives a command to perform a task that requires traversal of end effector 106 between start and target positions, those start and target positions may be compared to indexed start/target position pairs of the table in FIG. 3. The row indexed by the start/target position pair that is most similar (e.g., in Euclidian distance) to the start and target positions associated with the task may be determined, e.g., by online trajectory engine 130. Then, online trajectory engine 130 or another component may examine precalculated joint trajectories in that row, one after another, until it finds a precalculated joint trajectory that is compatible with a state of an environment in which robot 100 operates, a state of robot 100, and/or one or more attributes of the task being performed by robot 100.

A precalculated joint trajectory may be "compatible" with a state of an environment in which robot 100 operates when, for instance, a risk of collision between robot and one or more static or dynamic obstacles falls below some predetermined threshold, or when the precalculated joint trajectory otherwise satisfies one or more constraints imposed on the environment (e.g., "no go" zones, etc.).

A precalculated joint trajectory may be compatible with a state of robot 100 when, for instance, robot 100 can implement a joint trajectory that traverses end effector 106 along the precalculated joint trajectory without violating any kinematic or other constraints of robot 100. For example, if the joint trajectory robot 100 would implement in order to achieve the end effector trajectory poses an unacceptable risk (e.g., greater than a threshold risk) of reaching robot singularity, online trajectory engine 130 may move to the next precalculated joint trajectory.

A precalculated joint trajectory may be compatible with one or more attributes of a task being performed by robot 100 depending on a variety of factors. Suppose the task is for robot 100 to grasp a fragile object such as an egg or glassware. Such a delicate task may require robot 100 to move at a slow or deliberate pace to avoid damaging the fragile object, which may eliminate precalculated trajectories that might pose a risk to the fragile object. As another example, suppose the task is to carry a container filled with liquid. Such a task may require that robot 100 orient and maintain the container upright, and may eliminate precalculated trajectories that would pose an unacceptable risk of tilting the container far enough to spill the liquid.

Precalculated trajectories may be stored in offline trajectory database 136 in various ways. In some implementations, the precalculated trajectories for each row may be stored as a linked list, with the start/target position pair being the first node, and each precalculated joint trajectory node including a pointer to the next precalculated joint trajectory. In some such implementations, when a new precalculated joint trajectory is added, it may simply be appended to the end of the linked list. Additionally or alternatively, in some implementations, a new precalculated joint trajectory may be inserted between existing precalculated trajectories based on a variety of factors, such as similarity to those existing precalculated trajectories. Other ways of storing precalculated trajectories are contemplated herein, such as directed graphs, database records, etc.

Figure 4:
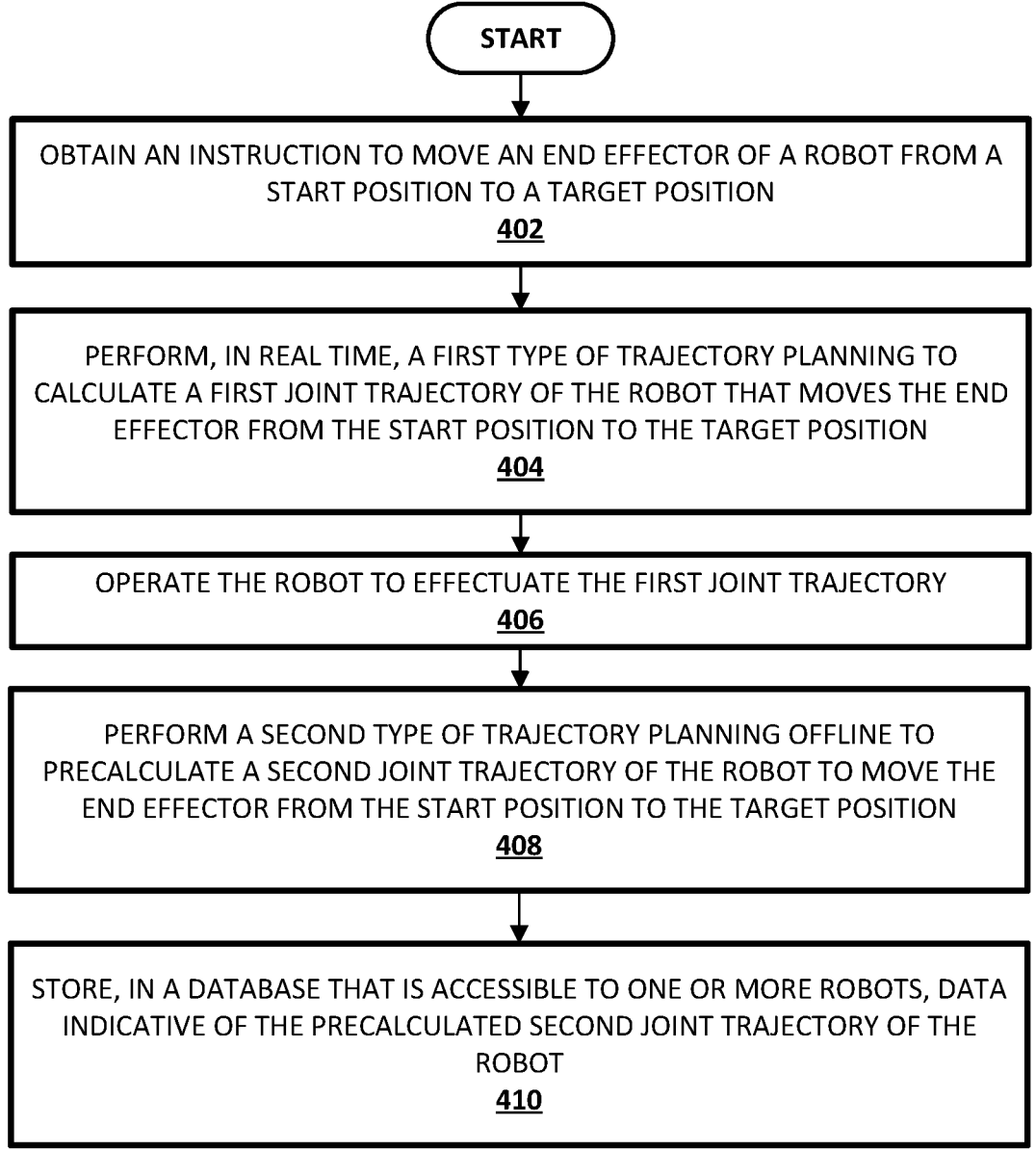
FIG. 4 depicts an example method in accordance with various implementations.

Referring now to FIG. 4, an example method 400 of practicing selected aspects of the present disclosure is described. For convenience, the operations of the flowchart are described with reference to a system that performs the operations. This system may include various components of various computer systems. For instance, some operations may be performed at robot 100, while other operations may be performed by one or more components of control system 150 and/or cloud trajectory engine 180. Moreover, while operations of method 400 are shown in a particular order, this is not meant to be limiting. One or more operations may be reordered, omitted or added.

At block 402, the system may obtain an instruction to move an end effector of a robot (e.g., 100) from a start position to a target position. For example, a user may operate GUI 160 to issue one or more commands to robot 100 to perform some task that requires robot 100 to move end effector 106 between a start position and a target position.

At block 404, the system may perform, e.g., in real time or online (i.e. during active robot operation), a first type of trajectory planning to calculate a first joint trajectory of the robot that moves the end effector from the start position to the target position. In various implementations, the first type of trajectory planning may require a relatively small amount of resources (e.g., time, processing cycles, memory), and may include, for instance, RRT or other similar techniques that are suitable for real time use.

At block 406, the system may operate the robot to effectuate the first joint trajectory. As noted previously, the trajectory planning technique performed at block 404 may be computationally and/or temporally inexpensive, so that the robot can implement the trajectory quickly, with little or no latency. This improves the user experience and makes robot operation more predictable temporally, even if the ultimately-implemented trajectory may not be ideal from a wear-and-tear or other perspective.

At block 408, which may occur sometime later when the robot is offline, or at any time when performed by cloud trajectory engine 180, the system may perform a second type of trajectory planning to precalculate a second joint trajectory of the robot to move the end effector from the start position to the target position. The second type of trajectory planning may require a greater amount of resources than was require to perform the first type of trajectory planning at block 404. For example, if the first type of trajectory planning performed at block 404 was RRT, the second type of trajectory planning employed at block 408 may be, for instance, RRT*, Anytime*, bidirectional RRT* ("Bi-RRT*"), Covariant Hamiltonian Optimization for Motion Planning ("CHOMP"), Stochastic Trajectory Optimization for Motion Planning ("STOMP"), and so forth.

At block 410, the system may store, e.g., in offline trajectory database 136, data indicative of the precalculated second joint trajectory of the robot that was determined at block 408. In various implementations, the precalculated second joint trajectory may be subsequently usable by one or more robots upon receiving a subsequent instruction that is comparable to the instruction obtained at block 402. For example, and as noted above, online trajectory engine 130 may compare the start position and target positions determined at block 402 to start/target position pairs used to index offline trajectory database 136 to determine a closest match. Once the closest match is identified, the precalculated trajectories associated with the start/target position pair may be examined, e.g., as described previously with respect to FIG. 3, to determine a precalculated joint trajectory that may be employed to enable the robot to perform its assigned task.

Figure 5:
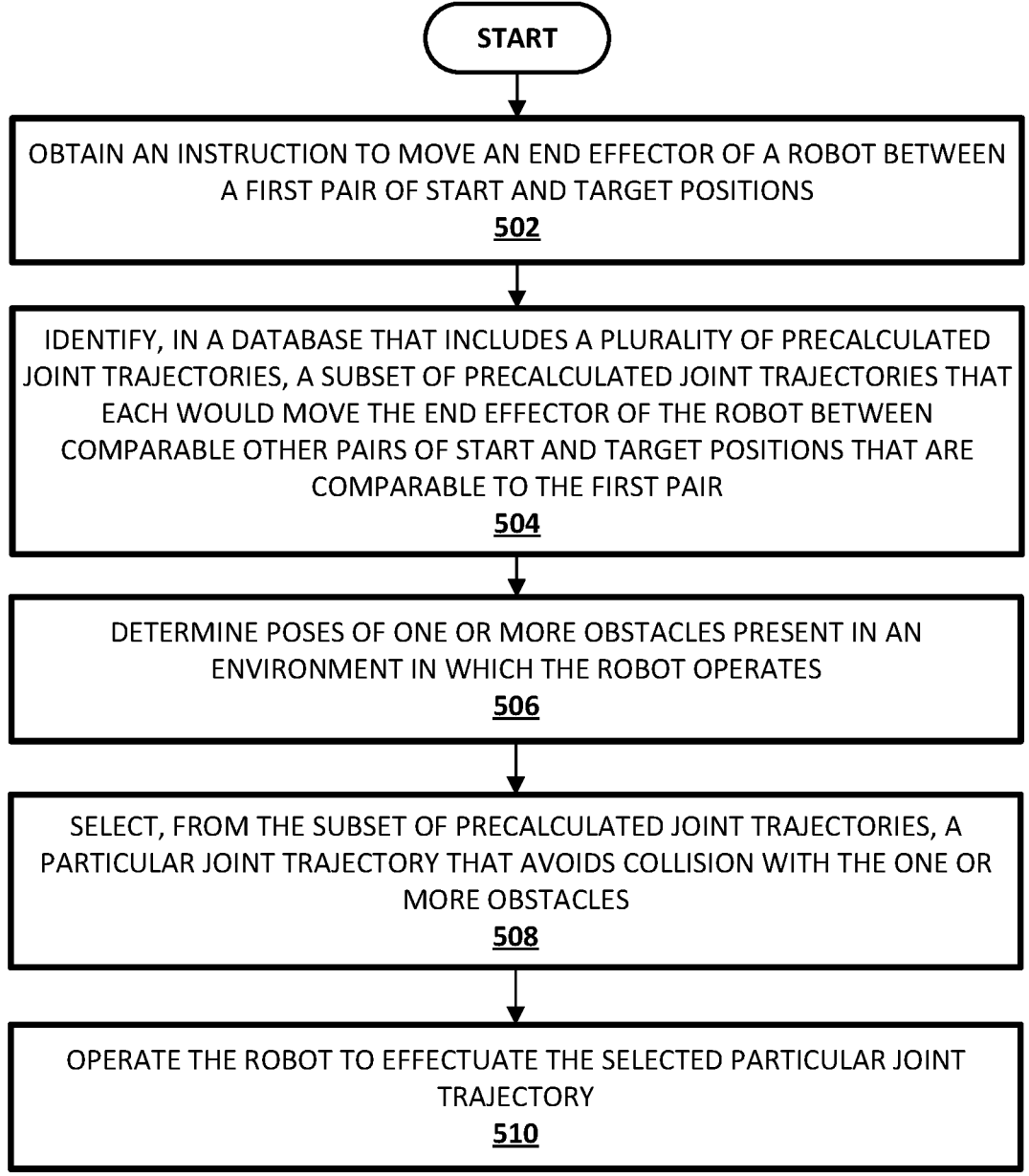
FIG. 5 depicts another example method in accordance with various implementations.

Referring now to FIG. 5, an example method 500 of practicing selected aspects of the present disclosure is described. For convenience, the operations of the flowchart are described with reference to a system that performs the operations. This system may include various components of various computer systems. For instance, some operations may be performed at robot 100, while other operations may be performed by one or more components of control system 150 and/or cloud trajectory engine 180. Moreover, while operations of method 500 are shown in a particular order, this is not meant to be limiting. One or more operations may be reordered, omitted or added.

At block 502, the system may obtain an instruction to move an end effector of a robot between a first pair of start and target positions. This instruction may be a direct instruction from a user to move the end effector between the first pair of start positions, and/or may an indirect instruction determined from a broader task assigned to a robot by a user.

At block 504, the system may identify, in a database that includes a plurality of precalculated joint trajectories (e.g., 136), a subset of precalculated joint trajectories that each would move the end effector of the robot between comparable other pairs of start and target positions that are comparable to the first pair. Although not depicted in FIG. 5, in some implementations, the system may, in parallel with the operations of block 504, perform operations similar to block 404 in FIG. 4 to generate a "backup" joint trajectory to use, e.g., as a last resort.

At block 506, the system may determine poses of one or more obstacles present in an environment in which the robot operates. At block 508, the system may select, from the subset of precalculated joint trajectories, a particular joint trajectory that avoids collision with the one or more obstacles. At block 510, the system may operate the robot to effectuate the selected particular joint trajectory. Alternatively, if no suitable precomputed joint trajectory is identified at block 504 or selected at block 508, then the system may operate the robot to effectuate the backup joint trajectory computed in parallel to block 504.

One benefit of techniques described herein is that each robot may be optimized to the environment in which it operates. A robot deployed in a home is likely to be instructed to perform the same task time and time again, such as cleaning up toys in a child's room, clearing dishes from a table to a sink and/or dishwasher, and so forth. Thus, each robot will generate (or have generated by cloud trajectory engine 180) precalculated databases tailored for the environment(s) in which they are deployed. This may be preferable to a single precalculated joint trajectory database for all robots (e.g., stored in the cloud), which could grow into a potentially enormous search space that might induce latency (due to searching time) even when robots use precalculated trajectories, rather than on the fly calculated trajectories.

In some implementations, precalculated trajectories may be indexed on states of a dynamic environment. For example, the current position and/or pose of one or more environmental objects/obstacles may be compared to indexed environmental states (i.e., positions and/or poses of objects/obstacles encountered previously). The closest matching or most comparable environmental state index may then lead to a plurality of precalculated joint trajectories that were previously successful under similar environmental circumstances. In some implementations, multiple levels of indexing may be employed. For example, each environmental state index may lead to a plurality of start/target position pair indices, and each start/target position pair index may lead to one or more precalculated trajectories, as described previously with respect to FIG. 3.

Figure 6:
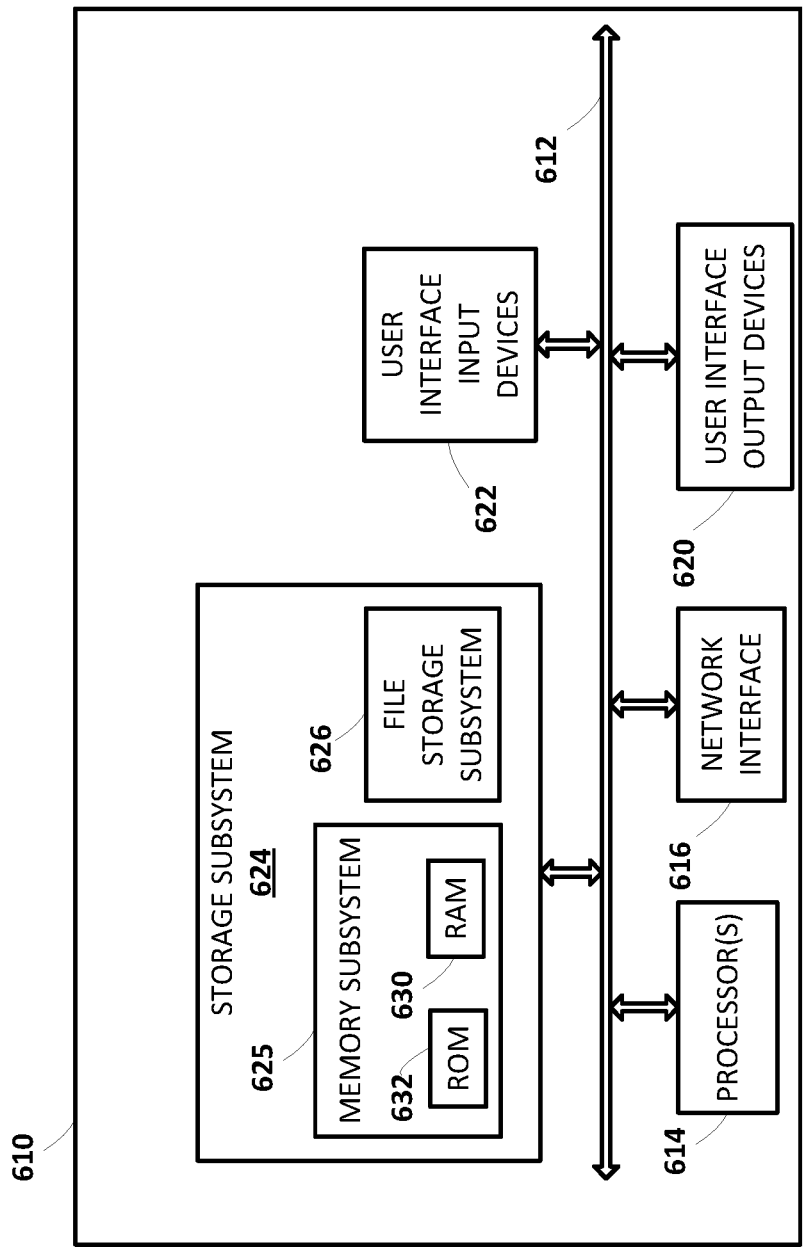
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of methods 400, and/or 500, and/or to implement one or more aspects of robot 100, control system 150, and/or cloud trajectory engine 180. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented one or more processors, comprising:
   obtaining an instruction to move an end effector of a robot from a start position to a target position;
   performing, in real time, a first type of trajectory planning to calculate a first joint trajectory of the robot that moves the end effector from the start position to the target position, wherein performing the first type of trajectory planning requires a first amount of resources;
   operating the robot to effectuate the first joint trajectory;
   performing a second type of trajectory planning to pre-calculate a second joint trajectory of the robot to move the end effector from the start position to the target position, wherein performing the second type of trajectory planning requires a second amount of resources that is greater than the first amount of resources required by the first type of trajectory planning; and
   storing, in a database that is accessible to one or more robots, data indicative of the precalculated second joint trajectory of the robot, wherein the precalculated second joint trajectory is subsequently usable by one or more of the robots upon receiving a subsequent instruction that is comparable to the instruction.

2. The method of claim 1, wherein the second type of trajectory planning comprises rapidly-exploring random tree star ("RRT*") planning.

3. The method of claim 2, wherein the first type of trajectory planning comprises rapidly-exploring random tree ("RRT") planning.

4. The method of claim 1, wherein the database is indexed by joint configuration pairs, each joint configuration pair including a start joint configuration and a target joint configuration.

5. The method of claim 4, wherein a given joint configuration pair in the database is linked to data indicative of a plurality of pre-calculated joint trajectories to move a robot end effector from the start joint configuration of the given joint configuration pair to the target joint configuration of the given joint configuration pair.

6. The method of claim 5, wherein one or more of the plurality of pre-calculated joint trajectories were pre-calculated using the second type of trajectory planning.

7. The method of claim 4, wherein the subsequent instruction is matched to the joint configuration pair to which the precalculated second joint trajectory is linked.

8. The method of claim 1, wherein the database is indexed by position pairs, each position pair including a start position and a target position of a robot end effector.

9. The method of claim 1, wherein the first type of trajectory planning is performed using logic integral with the robot.

10. The method of claim 9, wherein the second type of trajectory planning is performed remotely from the robot.

11. The method of claim 9, wherein the second type of trajectory planning is performed using the logic integral with the robot during a period of inactivity of the robot.

12. The method of claim 1, wherein the subsequent instruction is comparable to the instruction when one or both of start and end joint configurations required to implement the subsequent instruction are within a predetermined Euclidian distance, in joint space, of one or both of start and end joint configurations required to implement the instruction.

13. A method implemented one or more processors of a robot, comprising:
    obtaining an instruction to move an end effector of the robot between a first pair of start and target positions;
    identifying, in a database that includes a plurality of precalculated joint trajectories, a subset of precalculated joint trajectories that each would move the end effector of the robot between comparable other pairs of start and target positions that are comparable to the first pair;
    determining poses of one or more obstacles present in an environment in which the robot operates;
    selecting, from the subset of precalculated joint trajectories, a particular joint trajectory that avoids collision with the one or more obstacles; and
    operating the robot to effectuate the selected particular joint trajectory.

14. The method of claim 13, further comprising:
    performing, in real time in parallel with the identifying, a first type of trajectory planning to calculate a first joint trajectory of the robot that moves the end effector from the start position to the target position, wherein performing the first type of trajectory planning requires less resources than were required to calculate one or more of the plurality of precalculated joint trajectories.

15. The method of claim 13, wherein the database is indexed by joint configuration pairs, each joint configuration pair including a start joint configuration and a target joint configuration.

16. The method of claim 13, wherein the database is indexed by position pairs, each position pair including a start position and a target position of the robot end effector in Cartesian space.

17. The method of claim 13, wherein the database is indexed by a state of the environment in which the robot operates.

18. A robot comprising one or more processors and non-transitory memory, wherein the non-transitory memory includes instructions that, when executed by the one or more processors, cause the one or more processors to perform the following operations:
    performing, in real time, a first type of trajectory planning to calculate a first joint trajectory of the robot that moves the end effector from the start position to the target position, wherein performing the first type of trajectory planning requires a first amount of resources;
    operating the robot to effectuate the first joint trajectory;
    performing a second type of trajectory planning to precalculate a second joint trajectory of the robot to move the end effector from the start position to the target position, wherein performing the second type of trajectory planning requires a second amount of resources that is greater than the first amount of resources required by the first type of trajectory planning; and
    storing, in a database that is accessible to one or more robots, data indicative of the precalculated second joint trajectory of the robot, wherein the precalculated second joint trajectory is subsequently usable by one or more of the robots upon receiving a subsequent instruction that is comparable to the instruction.

19. The robot of claim 18, wherein the second type of trajectory planning comprises rapidly-exploring random tree star ("RRT*") planning.

20. The robot of claim 19, wherein the first type of trajectory planning comprises rapidly-exploring random tree ("RRT") planning.

* * * * *